US006692857B2

(12) United States Patent
Steenbakkers

(10) Patent No.: US 6,692,857 B2
(45) Date of Patent: Feb. 17, 2004

(54) PROCESS FOR THE PRODUCTION OF A COMPOSITE MEMBRANE

(75) Inventor: Edwin H. A. Steenbakkers, Urmond (NL)

(73) Assignee: DSM N.V., Heerlen (NL)

( * ) Notice: Subject to any disclaimer, the term of this patent is extended or adjusted under 35 U.S.C. 154(b) by 271 days.

(21) Appl. No.: 09/978,667

(22) Filed: Oct. 18, 2001

(65) Prior Publication Data

US 2002/0022169 A1 Feb. 21, 2002

Related U.S. Application Data

(63) Continuation of application No. PCT/NL00/00257, filed on Apr. 20, 2000.
(60) Provisional application No. 60/157,853, filed on Oct. 6, 1999.

(30) Foreign Application Priority Data

Apr. 21, 1999 (NL) .............................................. 1011855

(51) Int. Cl.$^7$ .............................. H01M 8/10; C08J 5/20; B05D 5/12
(52) U.S. Cl. ........................... 429/30; 429/33; 427/115; 427/384; 428/318.4; 521/27; 521/53
(58) Field of Search ..................... 429/30, 33; 427/115, 427/384; 428/318.4; 521/27, 53

(56) References Cited

U.S. PATENT DOCUMENTS 5,635,041 A    6/1997 Bahar
6,495,209 B1 * 12/2002 Cisar .......................... 427/384

FOREIGN PATENT DOCUMENTS

JP        634267      12/1994
WO       9820063       5/1998

* cited by examiner

Primary Examiner—Patrick Ryan
Assistant Examiner—Angela J. Martin
(74) Attorney, Agent, or Firm—Pillsbury Winthrop LLP

(57) ABSTRACT

Process for the production of a composite membrane comprising a porous film of a first polymer, the pores of which contain a second polymer, by depositing the second polymer from a solution in the pores of the first polymer, characterized in that the film of the first polymer is contacted with the surface of a first electrode which, together with at least one counterelectrode, is present in the solution of the second polymer and with such a potential difference being applied across the first electrode and the counterelectrode that the second polymer moves towards the first electrode, in which process it must pass the film.

7 Claims, No Drawings

PROCESS FOR THE PRODUCTION OF A COMPOSITE MEMBRANE

This is a continuation of International Application No. PCT/NL00/00257 filed Apr. 20, 2000 which designates the U.S., and was published under PCT Article (21(2) in English, and further claims priority from U.S. Provisional Application No. 60/157,853 filed Oct. 6, 1999, which are both incorporated herein by reference.

The invention relates to a process for the production of a composite membrane comprising a porous film of a first polymer, the pores of which contain a second polymer. The invention relates in particular to a process for the production of a composite membrane suitable for use in a fuel cell.

Such a process is known from WO 98/20063, in which it is described that a composite membrane can be produced by dissolving an ion-conducting polymer in a solvent which contains at least 25 wt. % of a component having a boiling point higher than 125° C., applying the resulting solution onto a horizontal porous membrane, the quantity of the solution being chosen so that the volume of the ion-conducting polymer is more than 60% of the pore volume, and subsequently evaporating the solvent at a temperature of at least 80° C.

Such a process has the drawback that evaporating the solvent out of the membrane takes very much time.

The object of the invention is to provide a process in which said drawback is not present or only to a lesser extent.

This object is achieved according to the invention by depositing the second polymer, from a solution, in the pores of the first polymer, characterised in that the film of the first polymer is contacted with the surface of a first electrode which, together with at least one counterelectrode, is present in the solution of the second polymer and with such a potential difference being applied across the first electrode and the counterelectrode that the second polymer moves towards the first electrode in which process it must pass the film.

In this way it is achieved that the second polymer is deposited in the pores of the porous film, so that the pores are filled completely and a composite membrane is formed.

The process according to the invention is suitable in particular for the production of a composite membrane from a film of a thickness of between 30 and 50 $\mu$m and with high air permeability or, in other words, a low Gurley value.

An advantage of the process according to the invention is that the formed composite membrane is gastight. This makes it suitable for use in a fuel cell.

A further advantage of the process is that it can be carried out easier in a continuous mode of operation than the known process.

Suitable electrodes are carbon, noble metals or compositions thereof, such as Pd, Pt and histalloy or doped ceramic materials. It is also possible for the counterelectrode to be made of the second polymer; this ensures that the concentration of the second polymer in the solution remains practically constant.

A suitable porous film of a first polymer may be for example a porous polyalkene film. Preferably the polyalkene film applied in the process is stretched in at least one direction. In this way, a high-strength film is obtained. Polyalkene membranes that are stretched in at least one direction are disclosed in EP-A-504,954. EP-A-504,954 describes a process for preparing a polyalkene film from a solution of a polyalkene in a volatile solvent. The film is passed through a cooling bath containing a liquid coolant and the solvent is removed at a temperature below the temperature at which the polyalkene dissolves in the solvent, whereupon the film is stretched in at least one direction. If the polyalkene is polyethylene, the weight-average molecular weight may vary between 100,000 and 5,000,000 g/mole. The film preferably contains polyethylene with a weight-average molecular weight of less than 500,000 g/mole. It has been found that membranes with a mean pore size of between 0.1 and 5.0 $\mu$m can readily be produced in the presence of polyethylene having such a molecular weight. Particularly suitable are blends of polyethylenes having different molecular weights. A blend containing for example polyethylene with a weight-average molecular weight of less than 500,000 g/mole may also contain polyethylene with a weight-average molecular weight higher than 1,000,000 g/mole. Due to the presence of the latter polyethylene a high-strength film is obtained and the film can be stretched so that a Gurley value of less than 1 s/50 cm$^3$, measured to ASTM Standard D726-58, can be obtained. A film with a Gurley value of less than 0.01 s/50 cm$^3$ generally has inadequate strength for use in a fuel cell.

According to the invention the porous film is contacted with a first of two electrodes. This can be effected for instance by passing the film along the electrode surface.

As the second polymer can be used polymers which contain charged groups (polyelectrolytes). The second polymer preferably is a proton-conducting polymer on the basis of perfluorosulphonic acid and the solvent preferably contains water, one or more alcohols from the group of cyclohexanol, pentanol, 1-propanol, 1,2-ethene diol, or a mixture of these solvents. More preferably the solvent contains a mixture of water and propanol. This will ensure that if the membrane has been incorporated in a fuel cell, a current density of at least 1 A/cm$^2$ can be achieved at a cell voltage of 0.4 V.

In general the cell voltage needed to bring about depositing of the second polymer in the porous film is between 5 and 100 V. The distance between the electrodes is in general between 0.5 and 5 cm.

In the case that water is present in the solvent, generation of gas can occur at the electrodes, in addition to electrophoresis of the second polymer. As the generation of gases can have a negative effect on the deposition of the second polymer in the porous film, the gas that is generated has to be removed. Methods for adequate removal of the generated gas are known from the literature. The gas can be removed adequately for instance by regularly reversing the polarity of the potential difference across the electrodes for a short while or by applying a square-wave voltage.

The invention also relates to the use in a fuel cell of a composite membrane obtained according to the invention.

The invention will be elucidated by means of an example without being restricted thereto.

EXAMPLE I

In a 5% solution of a proton-conducting polymer on the basis of perfluorosulphonic acid (Nafion®), the solvent of which consists of a 95/5 (wt/wt) propanol/water mixture, a porous polyethylene film having a porosity of 80 vol. %, a mean pore size of 1.5 $\mu$m and a thickness of 30 $\mu$m is passed along a first electrode at a speed of 20 mm/min, the contact surface between the film and the first electrode (anode) amounting to 150 cm$^2$. A counterelectrode (cathode) has been placed at a distance of 0.5 cm from the first electrode and the voltage applied is 50 V. The pores in the part of the film that had been passed along the electrode appeared to be filled with Nafion.

What is claimed is:

1. A process for the production of a composite membrane comprising a porous film of a first polymer, wherein the pores of said film contain a second polymer, deposited from a solution of the second polymer in the pores of the first polymer, said process comprising: contacting the film of the first polymer with the surface of a first electrode which, together with at least one counterelectrode, is present in the solution of the second polymer; applying a potential difference between the first electrode and the counterelectrode, sufficient to cause the second polymer to move towards the first electrode, so that the second polymer must pass the film.

2. A process according to claim 1, wherein the counterelectrode contains the second polymer.

3. A process according to claim 1, wherein the second polymer is a proton-conducting polymer containing perfluorosulphonic acid groups; and the solvent contains water, one or more alcohols or a mixture thereof.

4. A process according to claim 3, wherein the solvent contains a mixture of water and propanol.

5. A process according to claim 1, wherein the applied potential difference is from 5 V to 100 V.

6. A process according to claim 1, wherein the distance between the electrodes is 0.5 cm to 5 cm.

7. A fuel cell comprising a composite membrane obtained according to the process of claim 1.

* * * * *